INVENTOR
FRED M. YOUNG
BY *A.S.Krob*
ATTORNEY

Patented Jan. 14, 1941

2,228,549

UNITED STATES PATENT OFFICE 2,228,549

LAMINATED TUBE PLATE

Fred M. Young, Racine, Wis.

Application December 19, 1938, Serial No. 246,593

3 Claims. (Cl. 257—154)

The present invention relates to heat exchangers of the finned tube type having laminated tube plates, the laminations being first fabricated and then temporarily secured together preferably by means of spaced rivets before being assembled on the tube ends.

Thus the tube openings in the laminations with which I make up my tube plates may be punched in any shape and the laminations may be assembled into any desired thickness and present openings suitable for the reception of tubes having any shape in cross section.

A further disadvantage in solid tube plates is that it is difficult to form a complete bond between the plate and the tube ends. It is, in fact, difficult or impossible when brazing or silver soldering a tube into a thick plate to do so without overheating the tube because tubes of the class are made from non-ferrous material and the walls are very thin therefore they are easily overheated. It is difficult if not impossible to cause the bonding material to flow into the joints evenly and for the full width of the plate. In fact, the material frequently will not flow into the joint at all.

In the present invention, the entire plate may be dip-bonded into soft solder, the solder flowing between the laminations to the tubes and into the joint between the tubes and the plate, thus forming a complete interlocking bond beween the tube and plate for the full thickness of the plate providing greater strength and security against leaks than a brazed or silver soldered joint and without the danger of overheating the tubes.

In headers having thick tube plates and where the header cap is formed from sheet brass, it is difficult to make a suitable joint between the caps and the tube plates. In the present invention this difficulty is overcome by simply forming a suitable flange on one of the laminations for the reception and convenient bonding together of the cap and flange.

My invention is particularly adapted to radiators having thick tube plates and cast headers having flanges to which the tube plate is gasketed and bound and sealed to the flange by means of a sufficient number of bolts.

To these and other useful ends, my invention consists of parts, combinations of parts or their equivalents, and manner of construction, as hereinafter set forth and claimed and shown in the accompanying drawings in which:

Figure 1:
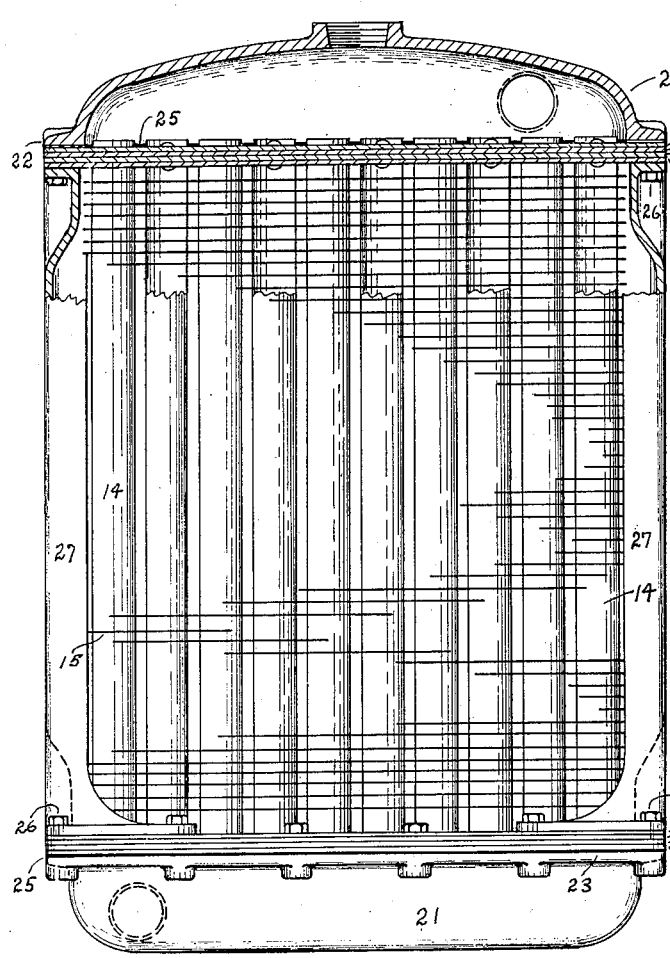
Fig. 1 is a front elevation of a complete radiator core having cast header caps which are secured to the tube plates by means of a suitable number of bolts and gaskets, a portion of the device being shown in section on line 1—1 of Figure 2.
Figure 2:
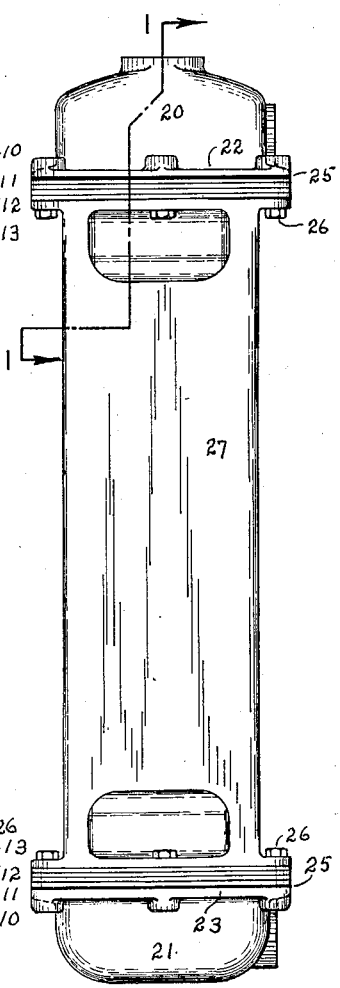
Fig. 2 is a side elevation of the radiator illustrated in Figure 1.
Figure 3:
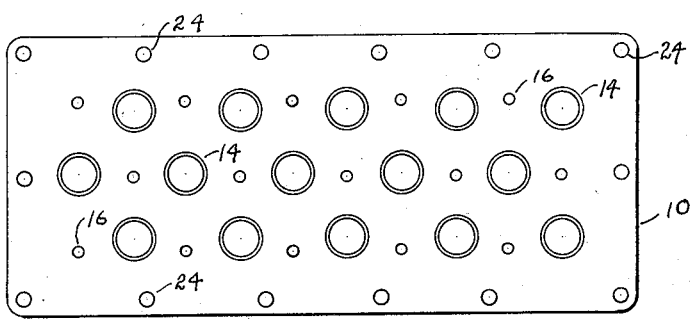
Fig. 3 is a bottom view of the device as illustrated in Figure 1 with the bottom cap removed.

As thus illustrated in Figures 1, 2 and 3, the tube plates each consist of a number of laminations designated by numerals 10, 11, 12 and 13. In the design shown it may be assumed that these laminations are each say ⅛" thick. Thus the complete assembly or tube plate in this instance is ½" thick. Each lamination is fabricated by punching to thereby provide suitable apertures for the reception of the tube ends, rivets and bolts.

Tubes 14 are provided with a multiplicity of closely spaced fins 15 through which the tubes extend as is the custom in radiators of the type. The laminations are secured together by means of rivets 16 and then assembled over the tube ends in the position illustrated after which the laminations and tube ends are preferably secured together by dip-bonding. Clearly, the molten solder will form a complete bond between the tube ends and laminations and between laminations. Thus the bonding will form an interlocked joint between the tubes and plates.

I provide an upper header cap 20 and a lower header cap 21 each being provided with machine faced flanges 22 and 23 and threaded openings which correspond with apertures 24 in the tube plates. Suitable gaskets 25—25 are provided thus the tube plates may be gasketed and secured to the caps by means of bolts 26 forming a pressure tight header with tube plates of sufficient thickness to prevent bulging and sufficient When radiators of the class operate under pressure, the tube plates which are flat must have considerable thickness in order to prevent bulging and if the tubes are not round it is difficult if not impossible to form suitable openings in such plates for the reception of the tube ends.

length of contact with the tubes to provide a substantial pressure tight joint.

Referring now to Figure 3 it will be noted that I provide a suitable number of rivets 16 which are spaced so as to hold the laminations into position until the assembling and bonding operations are completed. I provide the usual side frame members 27—27 to which the complete headers are secured as illustrated.

Thus it will be seen that I have provided a strong header which may be made suitable for any desired pressure and an assembly whereby after the tube plates have been placed in position over the tube ends, they may be dip bonded. Thus, clearly, the bonding material will flow between the laminations and to or from the tubes and form a complete bond for the thickness of the plates.

Figures 4, 5:
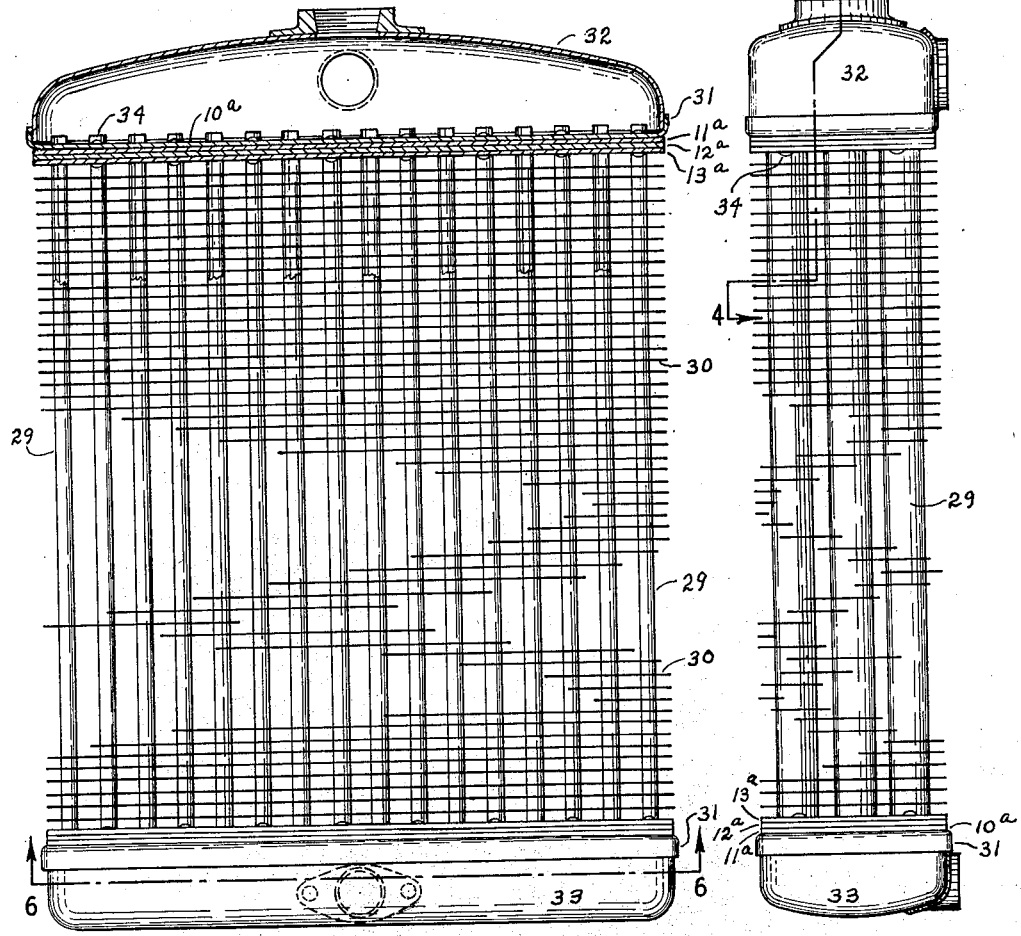
Fig. 4 is a front elevation of a radiator having a built-up header of a type which is usually used for cooling jacket water, a portion being sectioned on line 4—4 of Figure 5.
Fig. 5 is a side elevation of the device illustrated in Figure 4.
Figure 6:
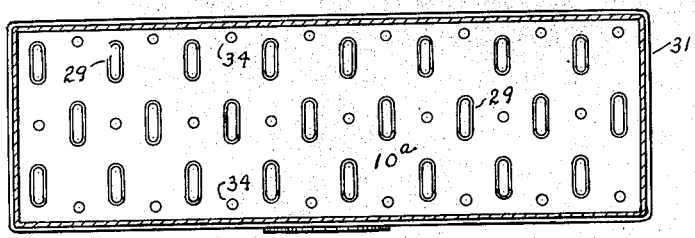
Fig. 6 is a transverse section of the device taken on line 6—6 of Figure 4.

Referring now to Figures 4, 5 and 6 wherein there are shown four laminations 10a, 11a, 12a and 13a having been punched suitable for the reception of tubes 29 the tubes being provided with fins 30 as is the custom in radiators of the class.

Lamination 10a differs from the other laminations in that it is provided with a peripheral flange 31 suitable for the reception of formed upper and lower header caps 32 and 33.

It will be noted by scrutinizing Figure 6 that I have provided a suitable number of spaced rivets 34 which are as in the other design, used for securing the laminations together and holding them until after they have been placed on the tubes and bonded thereto.

Thus it will be seen that a laminated tube plate of considerable thickness has been provided which is made from a number of laminations. One of the laminations having a flange suitable for the reception of the header cap. In the design shown, the outside lamination is provided with the flange. It will be understood that this flange may be formed on any one of the other laminations. For example, lamination 13a may be provided with an outwardly extending flange which is spaced far enough from the edges of the other laminations to provide room for the reception of the edges of the header caps.

If it is desired to provide a flange of greater thickness, then one of the laminations may be made from a thicker sheet than the others. In any event, the apertures in the laminations may be punched suitable for any shaped tube but after the assembly and bonding has been completed, a tube plate is provided which would have even greater rigidity than if it was made from a single sheet.

A particular advantage of the present invention is that the laminations from which the tube plates are made may consist of metal which is particularly suited for the purpose whereas in conventional tube plates which have considerable thickness, the plates must frequently be made from castings which cannot be adequately secured to the tubes except by brazing or silver soldering thus making it difficult to form the bond to the tubes without overheating the tubes.

Clearly many minor detail changes may be made without departing from the spirit and scope of the present invention as recited in the appended claims.

Having thus shown and described my invention, I claim:

1. A radiator of the class described, comprising headers having tube plates and a number of tubes operatively connected therebetween, a multiplicity of closely spaced fins through which said tubes extend, said tube plates comprising a number of laminations secured to the tubes and to each other by bonding, said laminations being fabricated and then secured together by means of spaced rivets before the tube ends are positioned in their respective openings.

2. A radiator of the class described, comprising headers having tube plates, a number of tubes operatively connected therebetween, a multiplicity of closely spaced fins through which said tubes extend, said tube plates comprising laminations secured to the tube ends and to each other by bonding, one of said laminations having a flange around its edge for the reception of the caps of said headers.

3. A radiator header of the class described, having a cap and a tube plate, said tube plate comprising a number of pre-fabricated laminations secured together by means of spaced rivets, tube ends inserted in the previously formed apertures in said laminations, said tube ends and laminations being intimately secured together by bonding.

FRED M. YOUNG.